United States Patent
Kang et al.

(10) Patent No.: US 10,359,572 B2
(45) Date of Patent: Jul. 23, 2019

(54) DEVICE AND METHOD FOR DETECTING OPTICAL SIGNAL

(71) Applicant: Electronics and Telecommunications Research Institute, Daejeon (KR)

(72) Inventors: Sae-Kyoung Kang, Daejeon (KR); Joon Ki Lee, Daejeon (KR); Jie Hyun Lee, Daejeon (KR); Joon Young Huh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/792,276

(22) Filed: Oct. 24, 2017

(65) Prior Publication Data

US 2018/0120507 A1 May 3, 2018

(30) Foreign Application Priority Data

Oct. 31, 2016 (KR) .................. 10-2016-0143182
Nov. 29, 2016 (KR) .................. 10-2016-0160555

(51) Int. Cl.
*G02B 6/42* (2006.01)
*G02B 6/293* (2006.01)
*H04B 10/67* (2013.01)
*H04J 14/02* (2006.01)
*H04B 10/27* (2013.01)
*H04B 10/572* (2013.01)
*G02B 27/14* (2006.01)

(52) U.S. Cl.
CPC ......... *G02B 6/2938* (2013.01); *G02B 6/4214* (2013.01); *G02B 6/4215* (2013.01); *G02B 6/4249* (2013.01); *H04B 10/67* (2013.01)

(58) Field of Classification Search
CPC .. G02B 6/2938; G02B 6/4214; G02B 6/4215; G02B 6/4249
USPC ................................. 398/48, 45, 43
See application file for complete search history.

(56) References Cited

U.S. PATENT DOCUMENTS

| | | | | |
|---|---|---|---|---|
| 5,854,867 A | * | 12/1998 | Lee | G02B 6/4214 385/49 |
| 6,454,470 B1 | * | 9/2002 | Dwarkin | G02B 6/4214 385/31 |
| 6,688,756 B1 | * | 2/2004 | Akiyama | F21V 5/048 348/E9.027 |
| 7,184,621 B1 | * | 2/2007 | Zhu | G02B 6/29361 385/24 |
| 7,450,858 B2 | * | 11/2008 | Verdiell | H01S 5/4087 398/164 |

(Continued)

OTHER PUBLICATIONS

T. Yoshimatsu, et al., "Compact and high-sensitivity 100-Gb/s (4 × 25 Gb/s) APD-ROSA with a LAN-WDM PLC demultiplexer," Optics Express, vol. 20, No. 26, Dec. 10, 2012 (6 pages, in English).

*Primary Examiner* — Oommen Jacob
(74) *Attorney, Agent, or Firm* — NSIP Law

(57) ABSTRACT

Provided is a device and method for detecting an optical signal. The optical signal detecting device may include an optical de-multiplexer configured to de-multiplex an input optical signal to optical signals of different wavelengths; an optical coupling lens configured to allow the optical signals of different wavelengths to be incident; an optical signal reflector configured to reflect the optical signals of different wavelengths emitted from the optical couple lens; and an optical detector configured to detect the reflected optical signals of different wavelengths.

16 Claims, 21 Drawing Sheets

(56) References Cited

U.S. PATENT DOCUMENTS

| | | | |
|---|---|---|---|
| 2002/0072111 A1* | 6/2002 | Clarkin | B01L 3/502707 435/287.1 |
| 2003/0147592 A1* | 8/2003 | Kim | G02B 6/4246 385/49 |
| 2004/0207893 A1* | 10/2004 | Miller | G02B 6/29373 359/223.1 |
| 2004/0208452 A1* | 10/2004 | Kropp | G02B 6/29367 385/47 |
| 2005/0018969 A1* | 1/2005 | Deane | G02B 6/4204 385/49 |
| 2005/0152640 A1* | 7/2005 | Lemoff | G02B 6/125 385/24 |
| 2006/0098697 A1 | 5/2006 | Kim et al. | |
| 2007/0104426 A1* | 5/2007 | Yun | G02B 6/4214 385/88 |
| 2007/0201881 A1* | 8/2007 | Douma | G02B 6/4246 398/202 |
| 2008/0193135 A1* | 8/2008 | Du | G02B 6/29362 398/88 |
| 2008/0310844 A1* | 12/2008 | Zhou | G02B 6/4246 398/79 |
| 2009/0097847 A1* | 4/2009 | Hosomi | G02B 6/29367 398/43 |
| 2009/0116838 A1* | 5/2009 | Kihara | G02B 6/4208 398/79 |
| 2011/0058771 A1* | 3/2011 | Lee | G02B 6/4215 385/33 |
| 2011/0081119 A1* | 4/2011 | Togami | G02B 6/3885 385/89 |
| 2012/0241795 A1* | 9/2012 | Chang | G02B 6/4201 257/98 |
| 2013/0292554 A1* | 11/2013 | Meinherz | G01V 8/14 250/221 |
| 2014/0099120 A1* | 4/2014 | Sorin | G02B 27/123 398/79 |
| 2014/0169389 A1 | 6/2014 | Kim et al. | |
| 2014/0178069 A1 | 6/2014 | Kim et al. | |
| 2014/0263970 A1* | 9/2014 | Heimbuch | G01J 1/0411 250/208.2 |
| 2014/0346323 A1* | 11/2014 | Fujimura | G01J 1/44 250/208.2 |
| 2015/0030042 A1* | 1/2015 | Kim | H01S 5/02292 372/20 |
| 2015/0323379 A1* | 11/2015 | Wu | G01H 9/00 73/655 |
| 2015/0330941 A1* | 11/2015 | Smith | H01L 29/66969 257/253 |
| 2015/0340995 A1* | 11/2015 | Story | H02M 3/155 330/288 |
| 2015/0370020 A1* | 12/2015 | Engel | G02B 6/4214 385/33 |
| 2016/0154195 A1* | 6/2016 | Lim | G02B 6/4214 385/33 |
| 2017/0084545 A1* | 3/2017 | Seddon | H01L 23/49827 |
| 2017/0123169 A1* | 5/2017 | Peh | G02B 6/4231 |
| 2017/0131492 A1* | 5/2017 | Vallance | G02B 6/4251 |
| 2017/0307166 A1* | 10/2017 | Courcier | F21S 41/24 |
| 2017/0373783 A1* | 12/2017 | Kang | H04J 14/02 |
| 2018/0120507 A1* | 5/2018 | Kang | G02B 6/2938 |

* cited by examiner

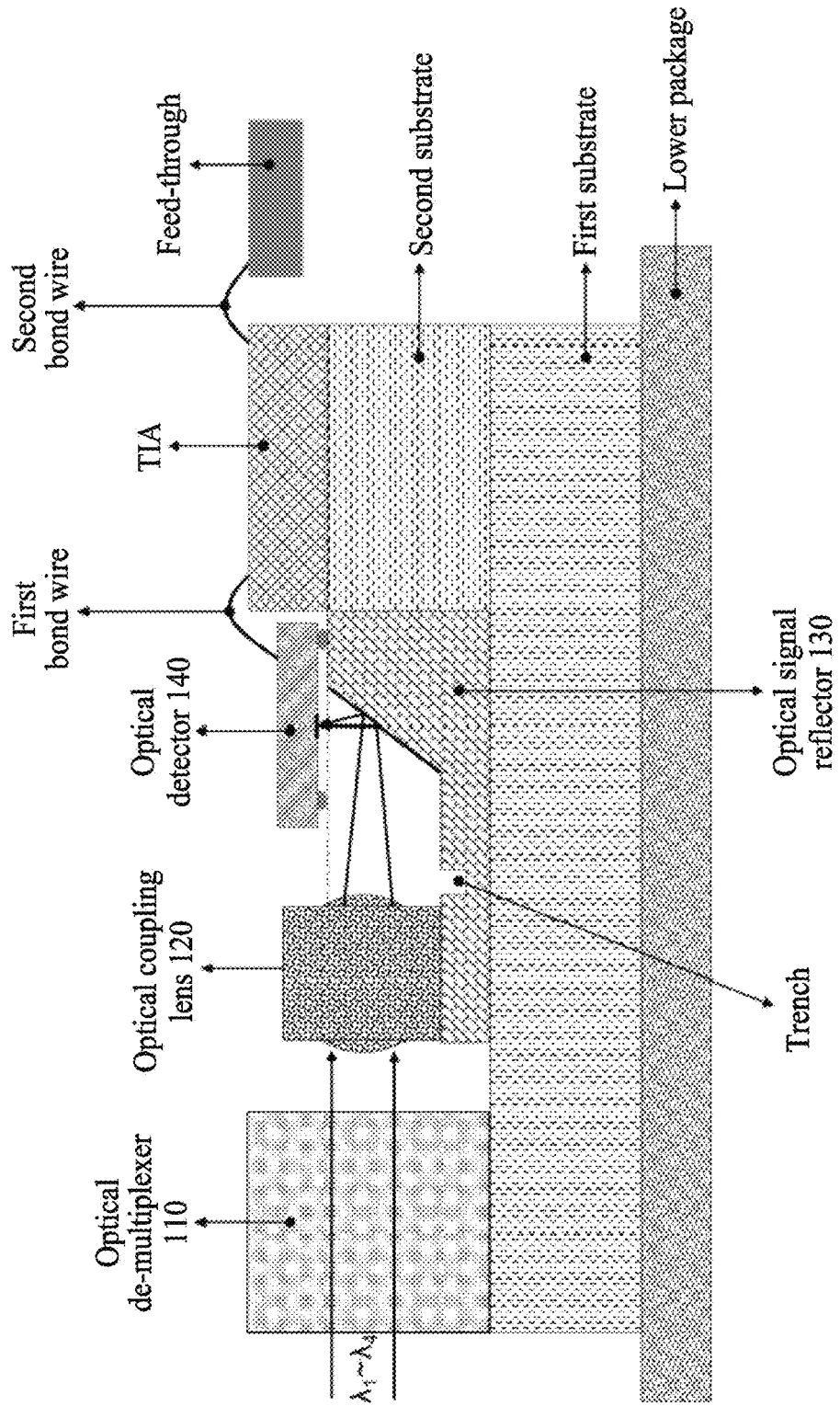

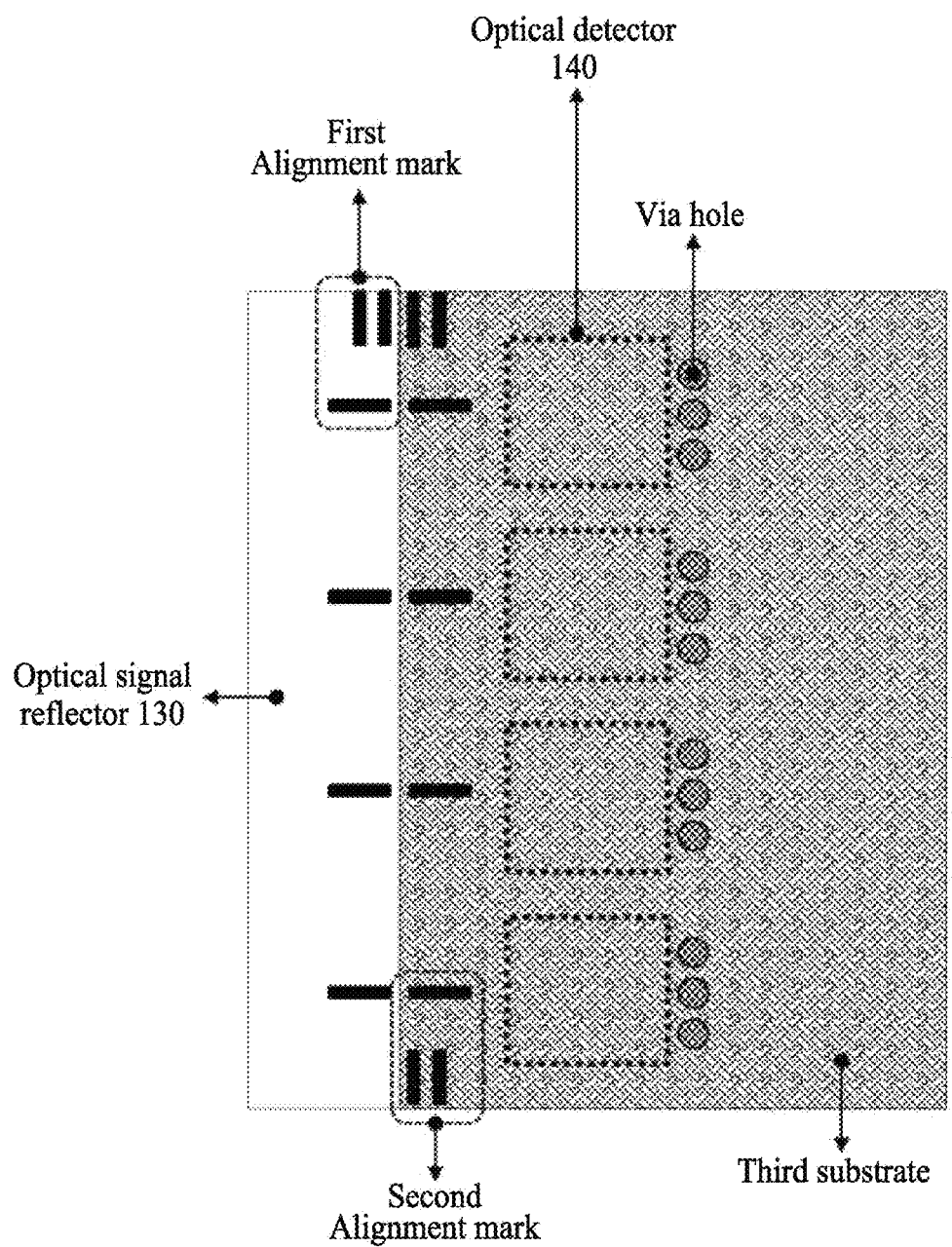

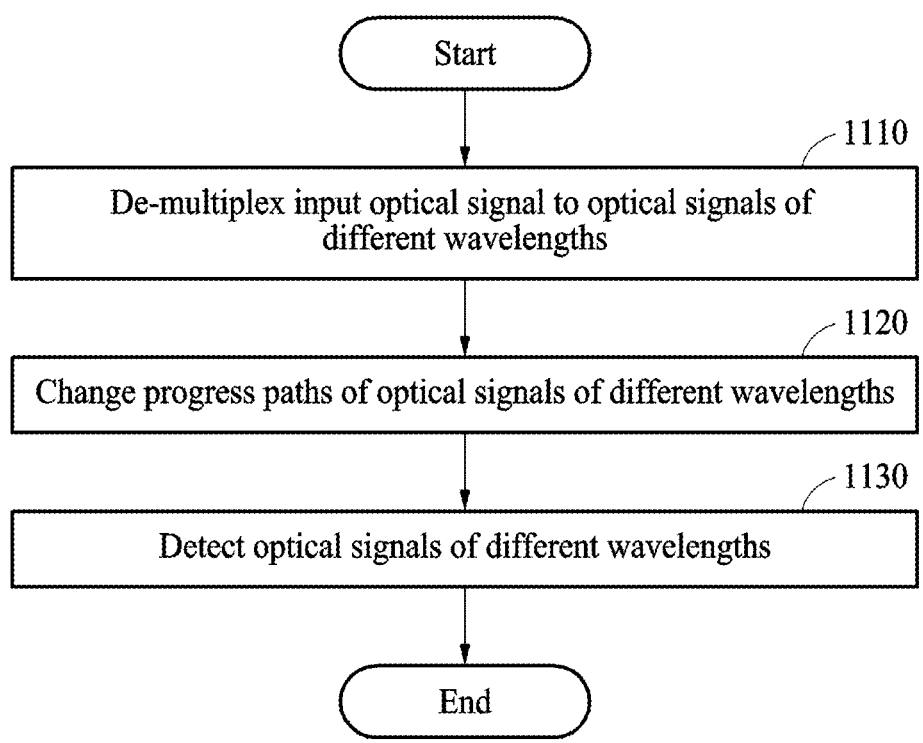

DEVICE AND METHOD FOR DETECTING OPTICAL SIGNAL

CROSS-REFERENCE TO RELATED APPLICATION(S)

This application claims the priority benefit of Korean Patent Application No. 10-2016-0143182 filed on Oct. 31, 2016, and Korean Patent Application No. 10-2016-0160555 filed on Nov. 29, 2016 in the Korean Intellectual Property Office, the disclosure of which is incorporated herein by reference for all purposes.

BACKGROUND

1. Field

One or more example embodiments relate to a device and method for detecting an optical signal.

2. Description of Related Art

An optical communication system includes a light transmitter configured to transform an electrical signal to an optical signal and a light receiver configured to receive the optical signal.

In the optical communication system, a scheme of using a planar light wave circuit (PLC) and a scheme of using a thin film filter are generally employed for the light receiver.

To this end, a substrate having a lateral pattern is required. However, a process of manufacturing the substrate having the lateral pattern is complex and manufacturing cost is high.

SUMMARY

At least one example embodiment provides a large multichannel optical signal detecting module that may be easily manufactured and may reduce a module cost.

At least one example embodiment also provides a multichannel optical signal detecting module that may be configured at low cost without applying a high-cost technology for a substrate having a lateral pattern and may change a progress path of an optical signal.

According to an aspect of at least one example embodiment, there is provided an optical signal detecting device including an optical de-multiplexer configured to de-multiplex an input optical signal to optical signals of different wavelengths; an optical coupling lens configured to allow the optical signals of different wavelengths to be incident; an optical signal reflector configured to reflect the optical signals of different wavelengths emitted from the optical couple lens; and an optical detector configured to detect the reflected optical signals of different wavelengths.

The optical coupling lens may be configured to change a progress path of each of the incident optical signals of different wavelengths.

In the optical coupling lens, a shape of an incident surface to which the optical signals of different wavelengths are incident may be different from a shape of an emission surface from which the optical signals of different wavelengths are emitted.

The optical signal reflector may include a reflection surface provided at a predetermined angle of inclination and configured to reflect the optical signals of different wavelengths emitted from the optical coupling lens toward the optical detector.

The optical signal detecting device may further include a first bond wire configured to transform the detected optical signals of different wavelengths to a current signal and to transfer the current signal; a trans-impedance amplifier (TIA) configured to transform the current signal transferred through the first bond wire to a voltage signal and to amplify the voltage signal; a second bond wire configured to output the transformed and amplified voltage signal to an electrical signal and to transfer the electrical signal; and a feed-through configured to transfer the electrical signal transferred through the second bond wire to an outside.

Each of a plurality of optical coupling lenses may be provided at a location of the optical signal reflector to allow each of the optical signals of different signals to be incident.

The optical detector may be configured to transfer a voltage signal transformed from the detected optical signals of different wavelengths to a TIA using a via hole.

The optical detector may be provided using an alignment mark of the optical signal reflector.

The optical coupling lens may include at least one of an incident surface to which the optical signals of different wavelengths are incident and an emission surface from which the optical signals of different wavelengths are emitted in a convex shape.

The optical detector may be provided to be in parallel with a progress direction of the input optical signal.

The optical coupling lens may be provided to be vertical relative to a progress direction of the input optical signal.

The optical coupling lens may be configured to emit each of the optical signals of different wavelengths in a different direction based on a shape of an emission surface from which the optical signals of different wavelengths are emitted.

The optical coupling lens may be configured to set the shape of the emission surface based on an angle of a reflection surface of the optical signal reflector.

The optical detector may be provided to face the TIA on the same substrate.

According to an aspect of at least one example embodiment, there is provided an optical signal detecting method including de-multiplexing an input optical signal to optical signals of different wavelengths; changing progress paths of the optical signals of different wavelengths using an optical coupling lens so that the optical signals of different wavelengths of which progress paths are changed are incident to an optical signal reflector; and detecting the optical signals of different wavelengths reflected from the optical signal reflector.

According to example embodiments, it is possible to provide a multichannel optical signal detecting module that may be configured at low cost without applying a high-cost technology for a substrate having a lateral pattern.

According to example embodiments, it is possible to provide a technology for changing a progress path of an optical signal at low cost.

According to example embodiments, it is possible to reduce a module cost through a process simplification and a low-cost package by manually aligning and assembling principal parts that constitute an optical signal detecting module.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 5A and 5B illustrate an optical signal detecting device according to an example embodiment;

FIGS. 8A, 8B, and 8C illustrate a structure of an optical signal reflector in an optical signal detecting device according to an example embodiment;

FIG. 11 is a flowchart illustrating a method of detecting an optical signal according to an example embodiment.

DETAILED DESCRIPTION

Figure 1:
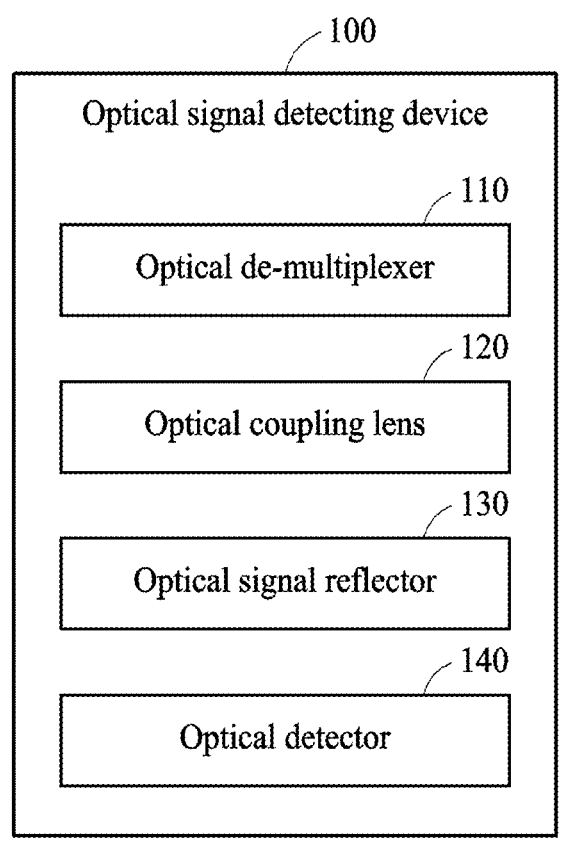
FIG. 1 is a diagram illustrating an optical signal detecting device according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, the example embodiments will be described with reference to the accompanying drawings. Like reference numerals refer to like elements throughout.

FIG. 1 is a diagram illustrating an optical signal detecting device 100 according to an example embodiment.

In an optical communication system that includes the optical signal detecting device 100, a light transmitter may transform an electrical signal to an optical signal, and an electrical transceiver may receive the electrical signal and may generate the optical signal. A light receiver may receive the optical signal and may transform the optical signal to the electrical signal. According to an increase in data capacity to be transmitted, the light transmitter may multiplex a plurality of wavelength signals into a single optical fiber and may transmit the single optical fiber using a wavelength division multiplexing (WDM) transmission scheme.

The light transmitter may transmit a 100 gigabyte (G) Ethernet signal through a single module optical fiber and a multimode optical fiber by applying the WDM transmission scheme to a backbone network and a short-distance Ethernet transmission field. The light transmitter may wavelength division multiplex an optical signal based on a light source having a plurality of wavelengths using an optical de-multiplexer and may transmit the multiplexed optical signal using a single optical fiber.

Here, once an optical signal having a plurality of wavelengths is input, the light receiver that includes the optical signal detecting device 100 may separate the optical signal for each wavelength using an optical de-multiplexer 110, and may apply the optical signal separated for each wavelength to an optical detector 140 and a trans-impedance amplifier (TIA) for each channel Here, the light receiver that includes the optical signal detecting device 100 may detect the optical signal and may transform the detected optical signal to an electrical signal, may amplify the electrical signal, and may output the amplified electrical signal.

Referring to FIG. 1, the optical signal detecting device 100 may include the optical de-multiplexer 110, an optical coupling lens 120, an optical signal reflector 130, and the optical detector 140. The optical signal detecting device 100 may be a multichannel optical signal detecting module configured to detect a multichannel optical signal.

The optical de-multiplexer 110 may de-multiplex the input optical signal to optical signals of different wavelengths. Here, the de-multiplexed optical signals of different wavelengths may be the optical signals of different wavelengths. The optical de-multiplexer 110 may be an optical de-multiplexing device.

The optical signals of different wavelengths may be incident to the optical coupling lens 120. Here, the optical coupling lens 120 may change a progress path of each of the incident optical signals of different wavelengths. Depending on example embodiments, in the optical coupling lens 120, a shape of an incident surface to which the optical signals of different wavelengths are incident may be different from a shape of an emission surface from which the optical signals of different wavelengths are emitted. Also, the optical coupling lens 120 may include at least one of an incident surface to which the optical signals of different wavelengths are incident and an emission surface from which the optical signals of different wavelengths are emitted in a convex shape.

Each of a plurality of optical coupling lenses 120 may be provided at a location of the optical signal reflector 130 to allow each of the optical signals of different wavelengths to be incident. Also, the optical coupling lens 120 may be provided to be vertical relative to a progress direction of the input optical signal.

The optical coupling lens 120 may emit each of the optical signals of different wavelengths in a different direction based on a shape of an emission surface from which the incident optical signals of different wavelengths are emitted. The optical coupling lens 120 may set the shape of the emission surface based on an angle of a reflection surface of the optical signal reflector 130.

The optical signal reflector 130 may reflect the optical signals of different wavelengths that are emitted from the optical coupling lens 120. Here, the optical signal reflector 130 may include a reflection surface provided at a predetermined angle of inclination and configured to reflect the optical signals of different wavelengths emitted from the optical coupling lens 120 toward the optical detector 140. The optical signal reflector 130 may be an optical signal reflecting block.

The optical detector 140 may detect the reflected optical signals of different wavelengths. Here, the optical detector 140 may transfer a current signal transformed from the detected optical signals of different wavelengths to the TIA using a via hole.

The optical detector 140 may be provided using an alignment mark of the optical signal reflector 130. Here, the optical detector 140 may be an optical detecting device, for example, a photodiode. The optical detector 140 may be provided to be in parallel with a progress direction of the input optical signal. Depending on example embodiments, the optical detector 140 may be provided to face the TIA on the same substrate.

According to an example embodiment, the optical signal detecting device 100 may further include the TIA, a feed-through, a first bond wire, and a second bond wire. Here, the first bond wire may transform the detected optical signals of different wavelengths to a current signal and may transfer the current signal. The TIA may transform the current signal transferred through the first bond wire to a voltage signal and may amplify the voltage signal. The second bond wire may output the transformed and amplified voltage signal to an electrical signal and may transfer the electrical signal. The feed-through may transfer the electrical signal transferred through the second bond wire to an outside.

Figure 2A:
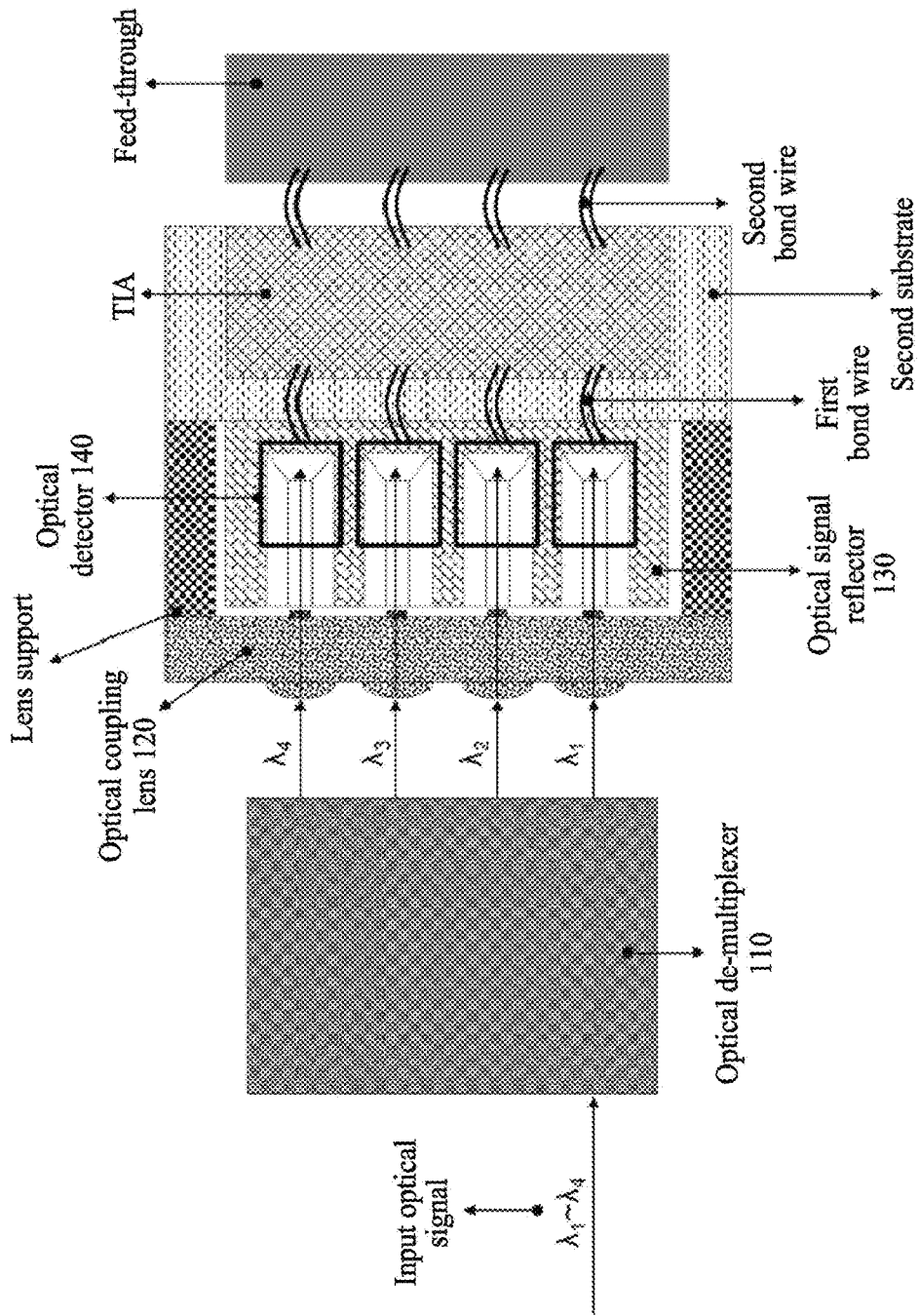
FIGS. 2A and 2B illustrate a structure of an optical signal detecting device according to an example embodiment.
Figure 2B:
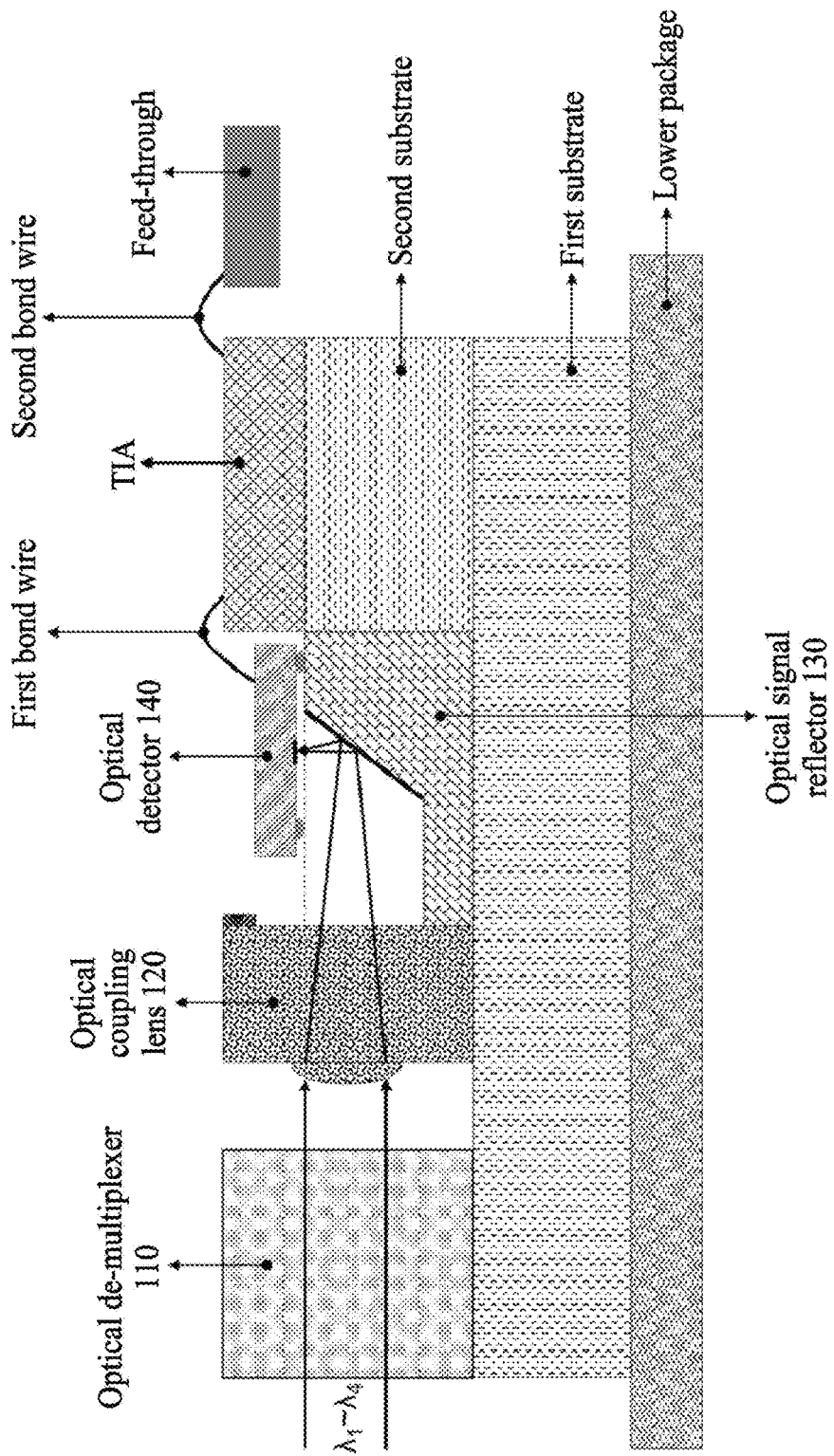

FIGS. 2A and 2B illustrate a structure of the optical signal detecting device 100 according to an example embodiment.

FIG. 2A is a top view of the optical signal detecting device 100 and FIG. 2B is a side view of the optical signal detecting device 100. Referring to FIGS. 2A and 2B, a light may be input in a parallel beam form to the optical signal detecting device 100 that detects a multichannel optical signal or a multi-wavelength optical signal. Here, an external optical access scheme may be configured so that an optical fiber ferrule may be connected in an optical fiber connection form or a receptacle form.

According to an example embodiment, a multi-wavelength optical signal may be received and may be de-multiplexed through an optical de-multiplexing block. Although the multi-wavelength optical signal may include $\lambda_1$ to $\lambda_4$, it is provided as an example only. Each output signal that is de-multiplexed and output may be optically coupled using the optical detector 140. Although the de-multiplexed and output optical signals may be $\lambda_1, \lambda_2, \lambda_3$, and $\lambda_4$, it is provided as an example only. The optical signal detecting device 100 may change a progress path of an optical signal emitted from the optical de-multiplexer 110 by performing an optical signal detecting method. The optical signal detecting device 100 may optically coupling optical signals of which progress paths are changed using the optical detector 140.

Each optical signal emitted through the optical de-multiplexer 110 may be incident to the optical coupling lens 120 in an array form or a single channel form. Here, an optical signal may be incident in a parallel beam form or a form of a beam that is emitted based on a refractive index between an external medium and a boundary surface of an emitter of the optical de-multiplexer 110. For example, the optical signal detecting device 100 may allow an optical signal in a parallel beam form to be incident.

An optical signal emitted through the optical coupling lens 120 may be applied to the optical signal reflector 130. Here, an optical signal reflected from the optical signal reflector 130 may be applied to the optical detector 140. A reflection surface may be formed on the optical signal reflector 130 to change a progress path of the optical signal. Also, the optical detector 140 may be provided at a preset location on the optical signal reflector 130 using a solder, such as gold-tin (AuSn).

An optical signal applied to the optical detector 140 may be transformed to a current signal and applied to a TIA chip through the first bond wire. The current signal may be transformed to a voltage signal and thereby amplified. An electrical signal output from the TIP chip may be connected to a feed-through of a package through the second bond wire and thereby connected to an outside.

According to an example embodiment, the optical coupling lens 120 may be provided on one side of a second substrate using a lens support or may be immediately provided on a first substrate. Here, the first substrate may include a material having a relatively excellent electrical insulation and a relatively high thermal conductivity based on a module structure. Also, when the first substrate has the same potential and ground between an electrical module case and a chip used for a module, the first substrate may be formed using a material, such as a metal. The second substrate may be set to be enlarged in order to mount the optical signal reflector 130 and the TIA chip. Also, the second substrate may be provided at an upper end of the first substrate. The first substrate may be provided at an upper end of a lower package. The optical de-multiplexer 110 may be provided on the first substrate.

Figure 3:
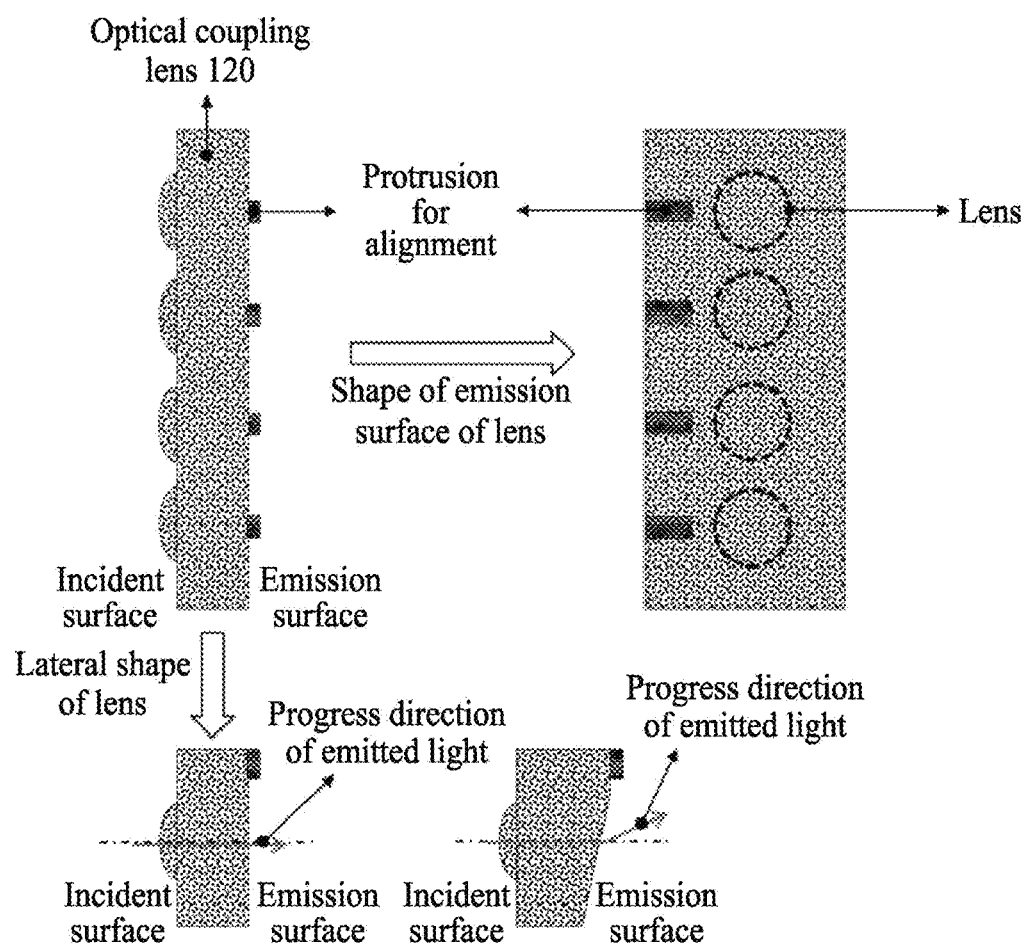
FIG. 3 illustrates a shape of an optical coupling lens in an optical signal detecting device according to an example embodiment.

FIG. 3 illustrates an example of a shape of the optical coupling lens 120 in the optical signal detecting device 100 according to an example embodiment.

Referring to FIG. 3, a side view of an incident surface and an emission surface of the optical coupling lens 120 can be known. The optical coupling lens 120 may be in an array form. Here, an alignment protrusion may be formed on the optical coupling lens 120 to be aligned with a center of the optical detector 140. Also, an optical signal emitted from the optical coupling lens 120 may be emitted horizontally in an emission direction or an inclined direction based on a shape of the emission surface of the optical coupling lens 120. Here, the shape of the emission surface of the optical coupling lens 120 may be set to be selected based on an angle at which a reflection surface is formed on the optical signal reflector 130.

According to an example embodiment, an incident surface of a side of the optical coupling lens 120 may be configured to include a convex shape and an emission surface thereof may be configured to include a planar shape. Here, an optical signal incident to the incident surface in a convex shape may have a progress direction different from a progress direction of light to be emitted, based on an angle of inclination of the emission surface in the planar shape. For example, an optical signal may be emitted in a direction parallel with a direction in which an optical signal is incident and thereby make a progress. Alternatively, the optical signal may be emitted at a predetermined angle with the incident optical signal and thereby make a progress.

Figure 4A:
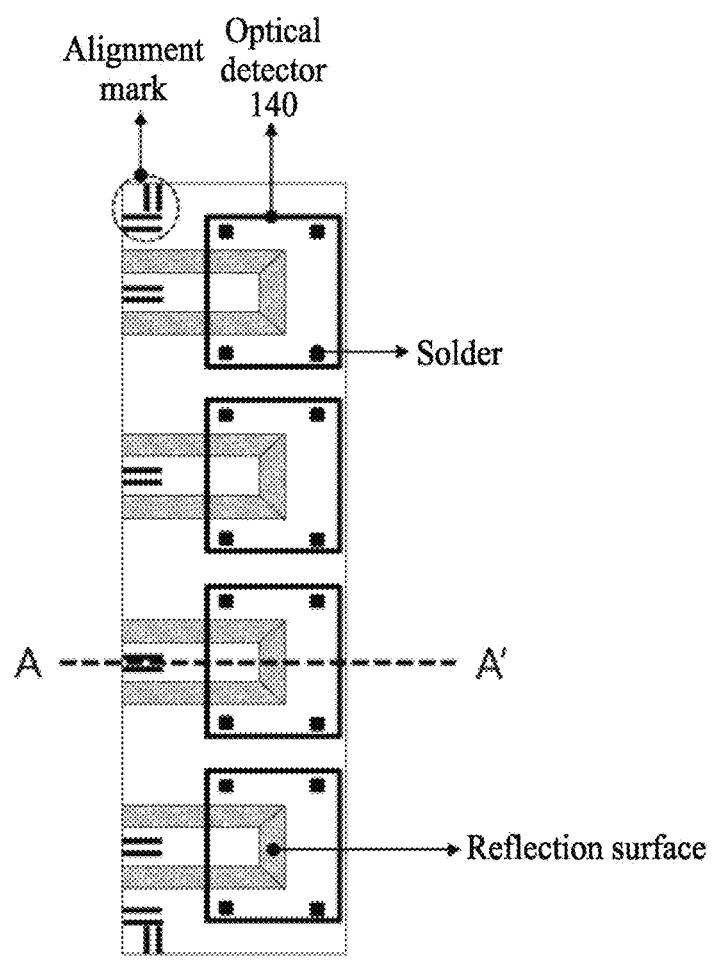
FIGS. 4A, 4B, and 4C illustrate a structure of an optical signal reflector in an optical signal detecting device according to an example embodiment.
Figure 4B:
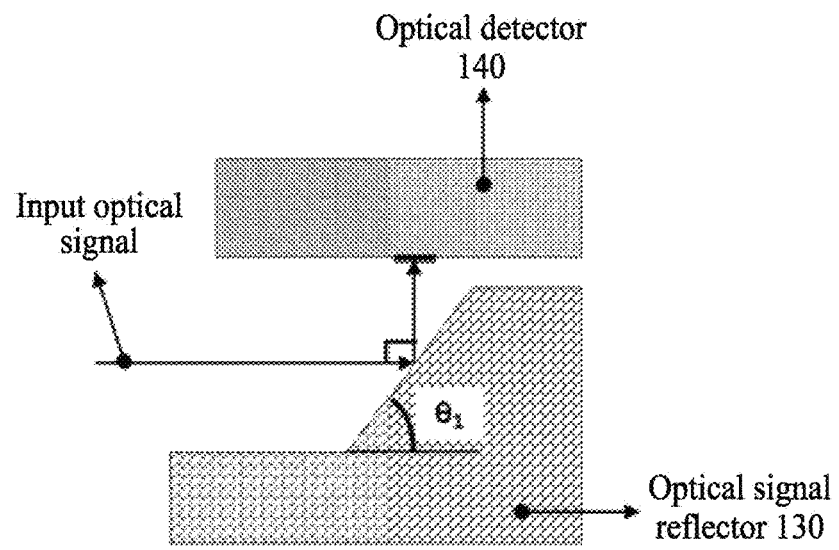
Figure 4C:
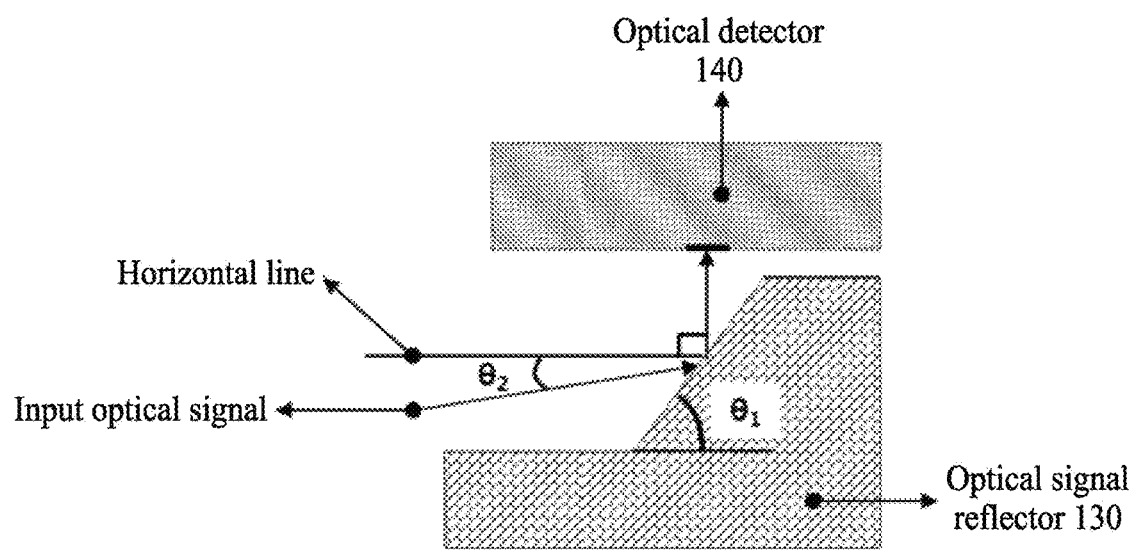

FIGS. 4A, 4B, and 4C illustrate a structure of the optical signal reflector 130 in the optical signal detecting device 100 according to an example embodiment.

FIG. 4A is a top view of the optical signal reflector 130, and FIGS. 4B and 4C illustrate side views of the optical signal reflector 130. Referring to FIG. 4A, the optical signal reflector 130 may include an alignment mark to be aligned with the optical coupling lens 120. Also, the optical signal reflector 130 may include a solder, such as AuSn, to mount the optical detector 140, a reflection surface to change a progress path of an optical signal, and the like.

FIGS. 4B and 4C are cross-sectional views cut along a line A-A' of FIG. 4A. Referring to FIG. 4B, a reflection surface may be on the optical signal reflector 130 at an angle of $\theta_1$ to achieve 90-degree optical signal path change. Here, the optical signal incident to the optical signal reflector 130 may be incident to the reflection surface in a horizontal direction to achieve the 90-degree optical signal path change by the reflection surface.

The reflection surface may be formed on the optical signal reflector 130 by chemically etching {111} crystal surface used for a silicon optical bench. Referring to FIG. 4C, an angle $\theta_1$ of the reflection surface formed by etching the crystal surface may be 54.74 degrees. Here, to make an optical signal be vertically incident to the optical detector 140, when the optical signal is incident to the optical signal reflector 130 to be inclined relative to a horizontal line with a specific angle $\theta_2$, the incident optical signal may be reflected through the reflection surface formed at an angle of 54.74 degrees and may be incident to the optical detector 140 in a vertical direction. Here, the specific angle $\theta_2$ may be 19.48 degrees. Meanwhile, the horizontal line may be in parallel with the optical signal incident to the optical signal detecting device 100, or may be in parallel with a substrate or a lower package of the optical signal detecting device 100.

Figure 5A:
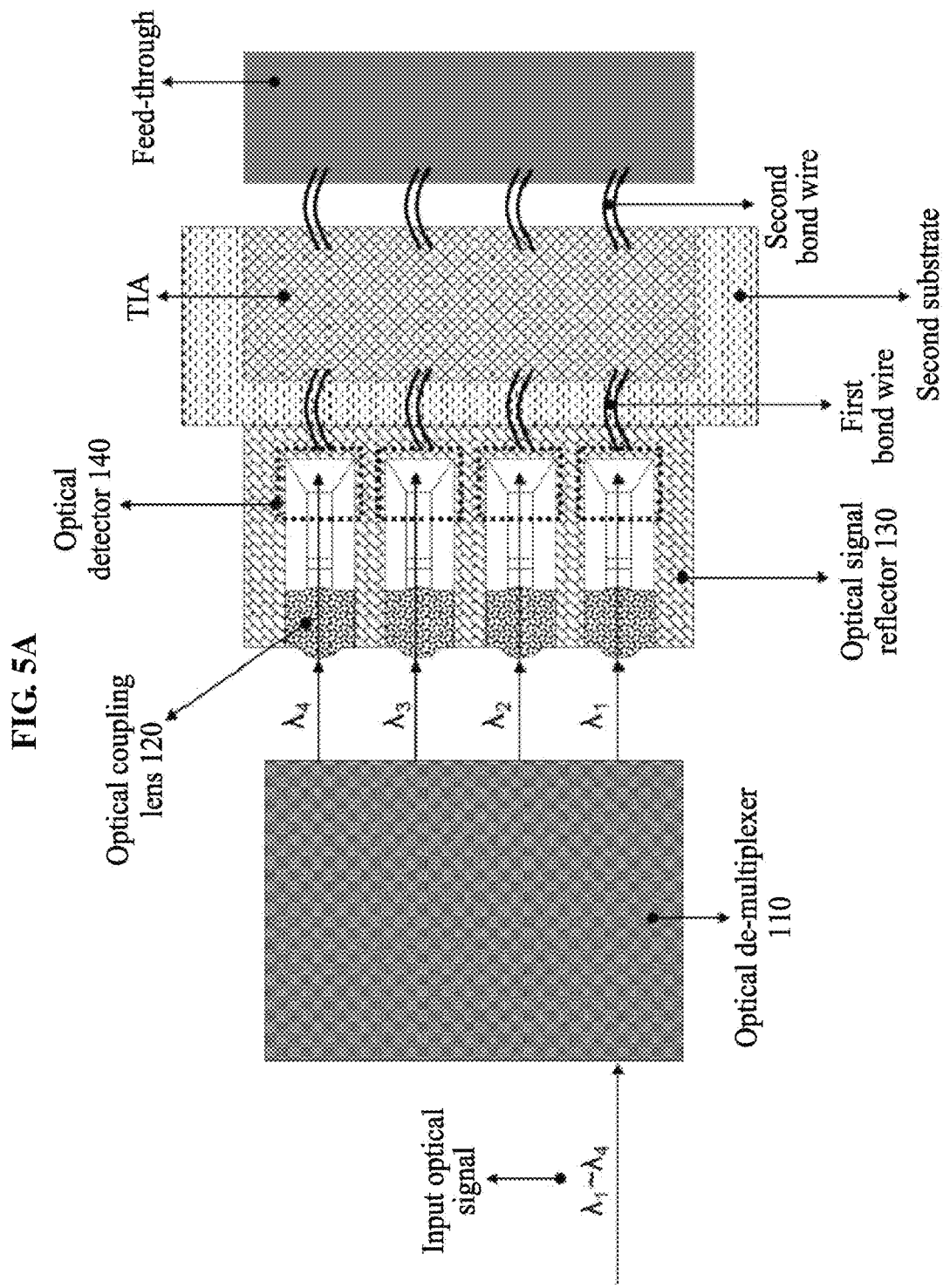

FIGS. 5A and 5B illustrate the optical signal detecting device 100 according to an example embodiment.

FIG. 5A is a top view of the optical signal detecting device 100 and FIG. 5B is a side view of the optical signal detecting device 100. Referring to FIG. 5A, the optical signal detecting device 100 may include the optical coupling lens 120 at a location that is individually set on the optical signal reflector 130. Here, the optical signal reflector 130 may be configured in a silicon optical bench form. The optical signal detecting device 100 may form a mounting groove of the optical coupling lens 120 using a silicon optical bench process. The mounting groove of the optical coupling lens 120 of the optical signal detecting device 100 is formed through a relatively collaborate process. Thus, the optical coupling lens 120 may be manually aligned and assembled.

According to an example embodiment, each optical signal emitted through the optical de-multiplexer 110 may be incident to the individual optical coupling lens 120. Here, the incident optical signal may be in a parallel beam form or a form of a beam that is emitted based on a refractive index between an external medium and a boundary surface of an emitter of the optical de-multiplexer 110. An optical signal emitted through the optical coupling lens 120 may be applied to and thereby reflected from the optical signal reflector 130, and may be applied to the optical detector 140. Here, the optical signal reflector 130 may include a reflection surface on which a progress path of the optical signal changes.

Referring to FIG. 5B, the optical coupling lens 120 may be provided on a groove formed on the optical signal reflector 130. Here, when fixably mounting the optical coupling lens 120 using an epoxy, a trench may be formed between the reflection surface and a groove for the optical coupling lens 120 to prevent the epoxy from contaminating the reflection surface. Also, the optical detector 140 may be provided at a preset location on the optical signal reflector 130 using the solder, such as gold-tin (AuSn).

The optical signal applied to the optical detector 140 may be transformed to a current signal, and the current signal may be applied to the TIA through the first bond wire and may be transformed to a voltage signal and thereby amplified. Here, an electrical signal output from the TIA chip may be connected to the feed-through of the package through the second bond wire and output to be connected to an outside. A first substrate may include a material having an electrically excellent insulation and a high thermal conductivity based on a module structure, or may include a material, such as metal, when the first substrate has the same potential or ground between an electrical module case and a chip used for a module. A second substrate may be enlarged to mount the optical signal reflector 130 to be adjacent to the TIA.

Figure 6A:
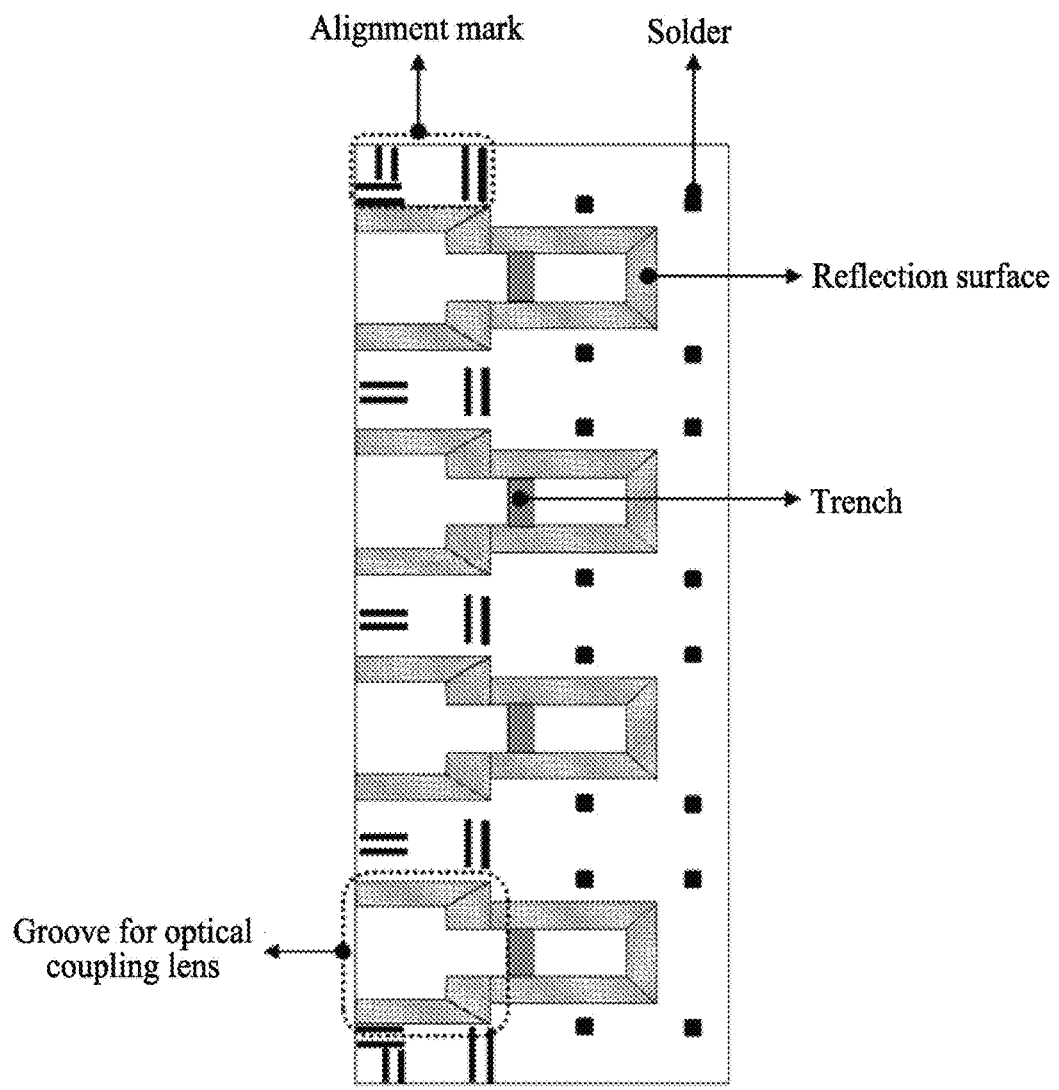
FIGS. 6A, 6B, and 6C illustrate a structure of an optical signal reflector and a shape of an optical coupling lens in an optical signal detecting device according to an example embodiment.
Figure 6B:
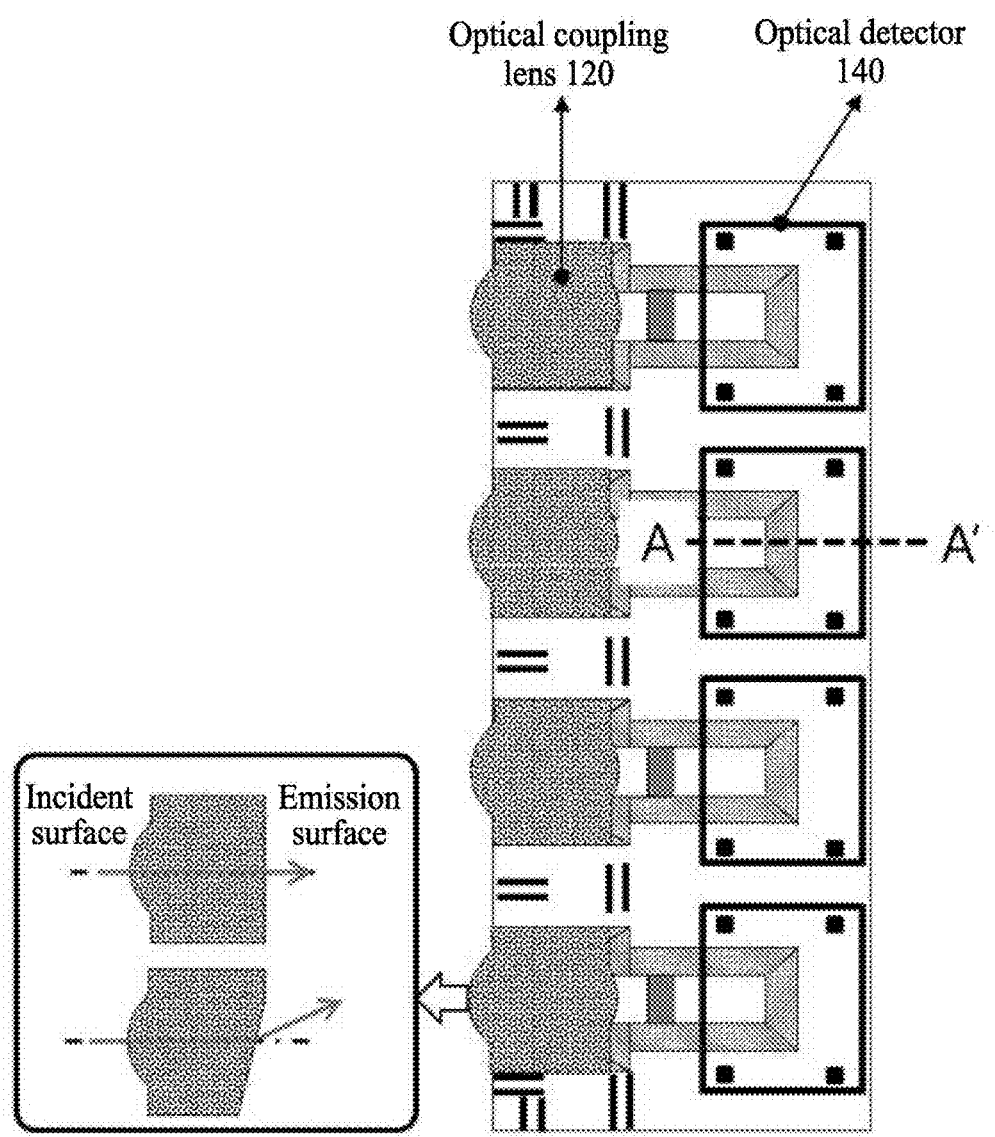
Figure 6C:
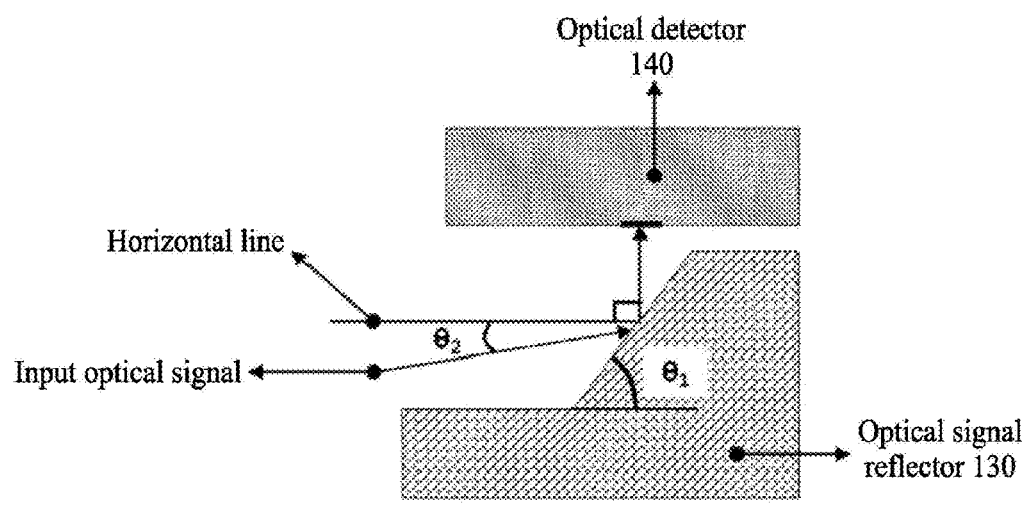

FIGS. 6A, 6B, and 6C illustrate a structure of the optical signal reflector 130 and a shape of the optical coupling lens 120 in the optical signal detecting device 100 according to an example embodiment.

FIGS. 6A and 6B are top views and 6C is a cross-sectional view of the optical signal reflector 130 and the optical coupling lens 120. Referring to FIGS. 6A and 6B, a configuration and an entire shape of the optical signal reflector 130 before and after providing the optical coupling lens 120 or the optical detector 140 can be known. The optical signal reflector 130 may include a groove for the optical coupling lens 120 and an alignment mark for aligning adjacent parts. The optical signal reflector 130 may also include a solder, such as gold-tin (AuSn), for bonding the optical detector 140, a reflection surface for changing a progress path of an optical signal, and the like.

The reflection surface formed on the optical signal reflector 130 may be provided at a an angle $\theta_1$ of 45 degrees for changing the progress path of the optical signal. The optical signal reflector 130 may allow the optical signal incident for changing the progress path of the optical signal at 90 degrees to be incident to the reflection surface in a horizontal direction using the reflection surface. Here, an emission surface of the optical coupling lens 120 of FIG. 6B may be set to have an angle of inclination vertical relative to the incident optical signal. Depending on example embodiments, unless the reflection surface is not formed at the angle $\theta_1$ of 45 degrees, the emission surface of the optical coupling lens 120 may be set to have an angle of inclination different from that of the reflection surface.

FIG. 6C is a cross-sectional view cut along A-A' of FIG. 6B. Referring to FIG. 6C, the reflection surface of the optical signal reflector 130 may be formed by chemically etching {111} crystal surface used for a silicon optical bench. If the reflection surface is formed at an angle $\theta_1$ of 54.74 degrees and the optical signal is incident to be inclined with a specific angle $\theta_2$ relative to a horizontal line, the optical signal may be incident to the optical detector 140 in a vertical direction through the reflection surface. For example, the specific angle $\theta_2$ may be 19.48 degrees. Meanwhile, to allow the optical signal to be incident to the reflection surface at the specific angle $\theta_2$, the emission surface of the optical coupling lens 120 may be processed to be inclined.

Figure 7A:
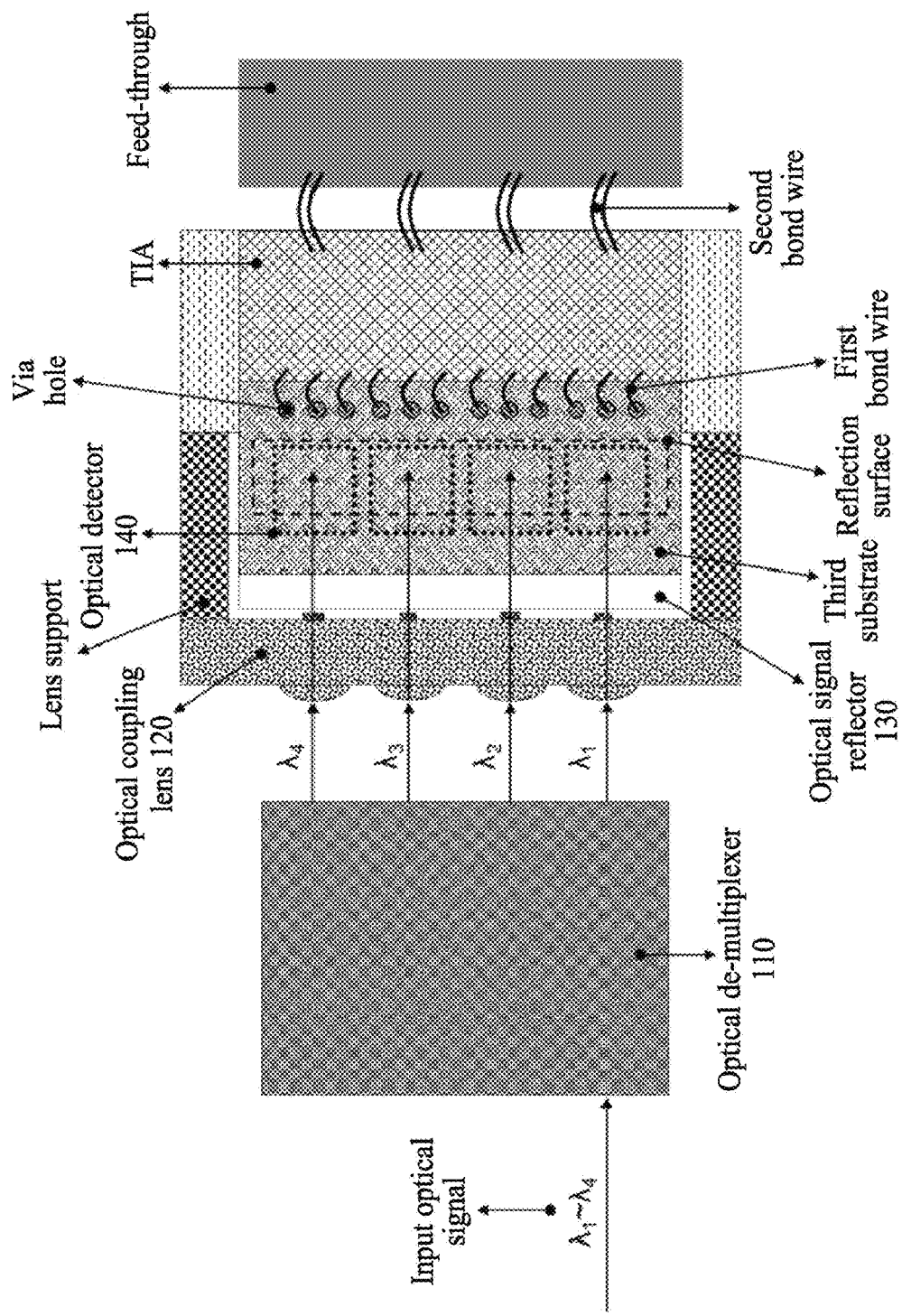
FIGS. 7A and 7B illustrate an optical signal detecting device according to an example embodiment.
Figure 7B:
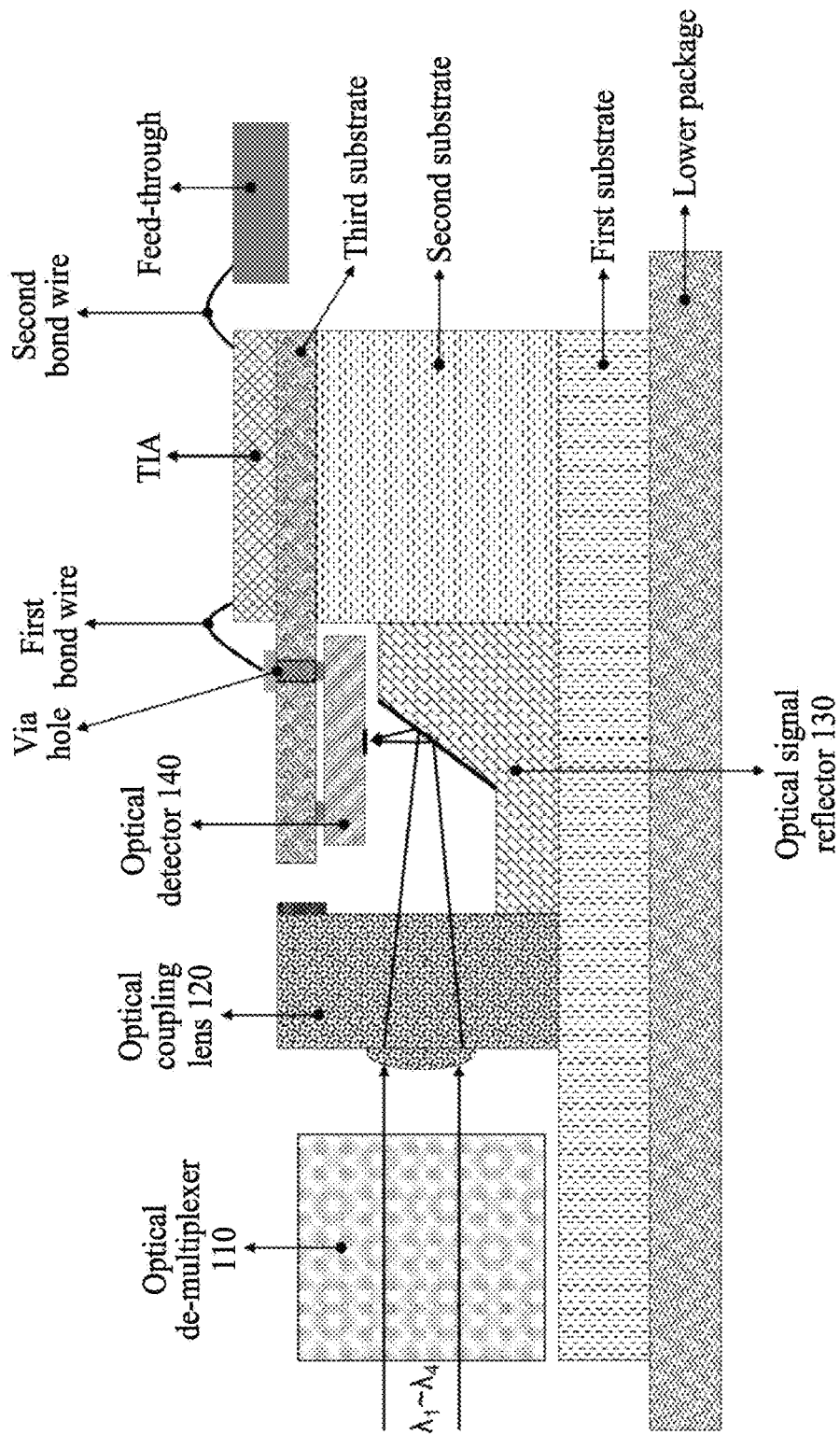

FIGS. 7A and 7B illustrate a configuration of the optical signal detecting device 100 according to an example embodiment.

FIG. 7A is a top view of the optical signal detecting device 100 and FIG. 7B is a side view of the optical signal detecting device 100. Referring to FIG. 7A, the optical signal detecting device 100 may include the optical detector 140 and the TIA chip on the third substrate as a single substrate. Here, each optical signal emitted through the optical de-multiplexer 110 may be incident to the optical coupling lens 120 in an array form or a single channel form. An incident optical signal may be in a parallel beam form or a form of a beam that is emitted based on a refractive index between an external medium and a boundary surface of an emitter of the optical de-multiplexer 110.

According to an example embodiment, an optical signal emitted through the optical coupling lens 120 may be applied to and reflected from the optical signal reflector 130 and thereby applied to the optical detector 140. Here, the optical signal reflector 130 may include a reflection surface on which a progress path of the optical signal changes. The optical detector 140 may be provided at a location set on the third substrate using a solder such as gold-tin (AuSn).

An optical signal applied to the optical detector 140 may be transformed to a current signal and may be applied to the TIA chip through the first bond wire to be connected to a substrate surface that is disposed to face a substrate surface on which the optical detector 140 is provided through the via hole formed on the third substrate. Here, the applied optical signal may be transformed to a voltage signal and thereby amplified. The optical signal reflector 130 and the optical detector 140 provided on the third substrate may be manually aligned and assembled through an alignment mark included in the third substrate and the optical signal reflector 130. Here, the reflection surface formed on the optical signal reflector 130 may be formed on a single substrate through the silicon optical bench process. Also, the optical signal reflector 130 may be configured by providing a block on which the reflection surface is formed on a separate substrate as the optical signal reflector 130.

Referring to FIG. 7B, an electrical signal output from the TIA chip may be connected to the feed-through of the package through the second bond wire and thereby output to be connected to an outside. The optical coupling lens 120 may be provided on one side of the second substrate using a lens support or may be immediately provided on the first substrate. Also, the first substrate may use a material having an electrically excellent insulation and a high thermal conductivity based on a module structure, or, may include a material, such as metal, when the first substrate has the same potential or ground between an electrical module case and a chip used for a module. Also, the second substrate may be enlarged to mount the optical signal reflector 130. Depending on cases, the third substrate may be enlarged to mount the TIA.

According to an example embodiment, the optical coupling lens 120 may be in an array form, and an alignment protrusion may be formed for alignment with a center of the optical detector 140. Here, an optical signal emitted from the optical coupling lens 120 may be emitted in a horizontal direction or an inclined direction based on a shape of the emission surface of the optical coupling lens 120. A shape of the emission surface of the optical coupling lens 120 may be selected based on an angle at which the reflection surface is formed on the optical signal reflector 130.

Figure 8B:
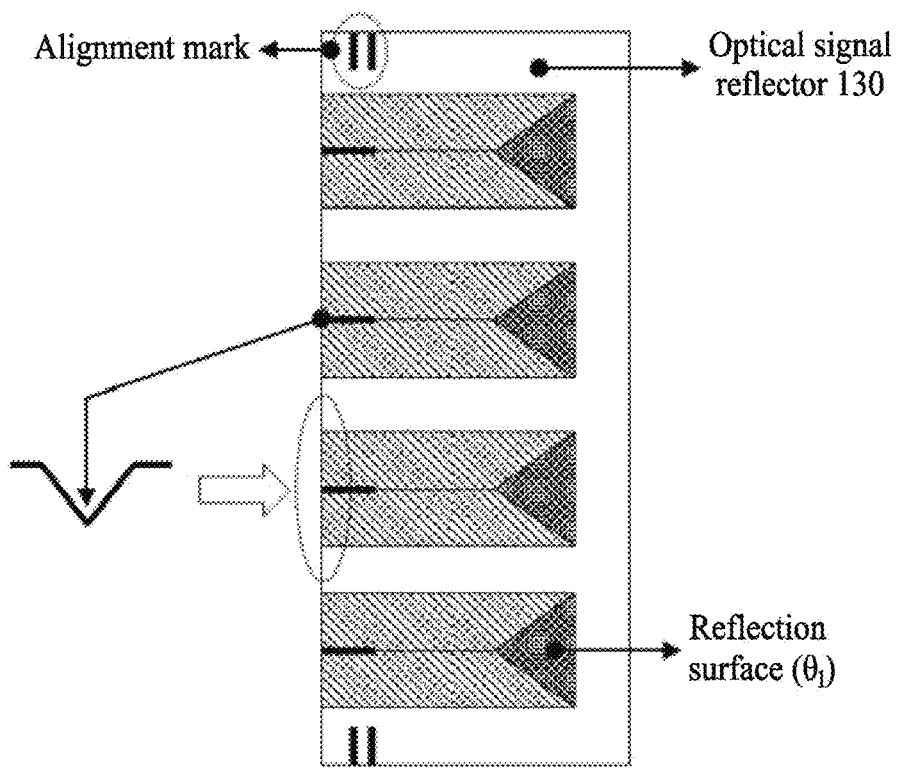
Figure 8C:
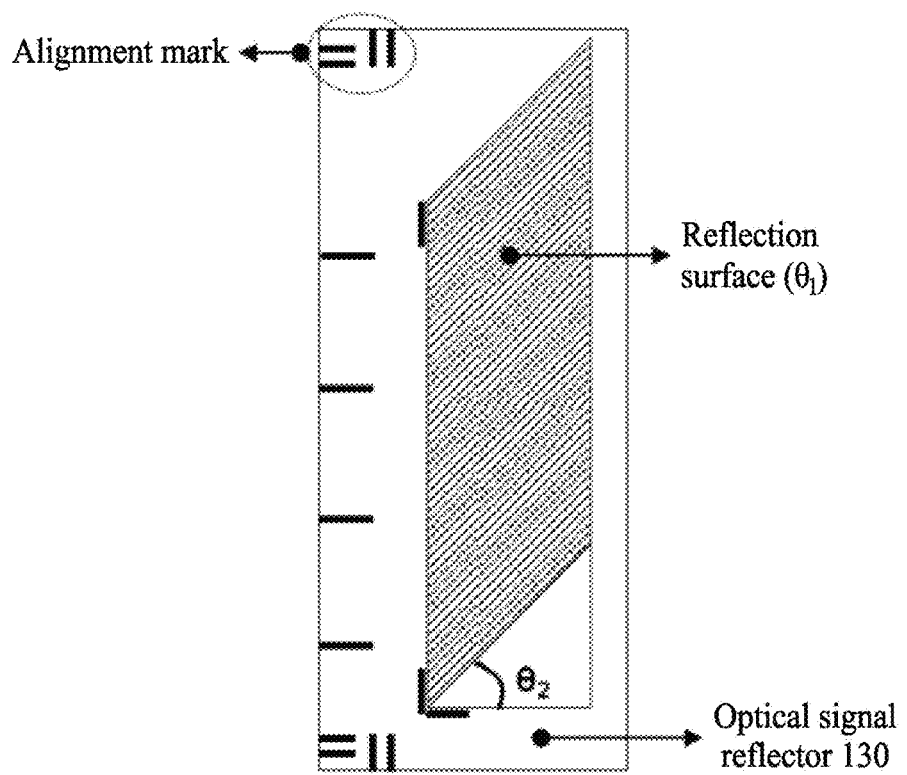

FIGS. 8A, 8B, and 8C illustrate a structure of the optical signal reflector 130 in the optical signal detecting device 100 according to an example embodiment.

FIGS. 8A, 8B, and 8C are top views of the optical signal reflector 130. Referring to FIG. 8A, it can be known that the third substrate on which the optical signal reflector 130 and the optical detector 140 are provided is aligned and assembled through alignment marks formed on two portions. Referring to FIG. 8B, it can be known that the optical signal reflector 130 is formed using a silicon optical bench. Here, the silicon optical bench may form the reflection surface by chemically etching {111} surface. When the reflection surface is formed at an angle $\theta_1$ of 54.74 degrees and an emission surface of the optical coupling lens 120 has a specific angle by applying an inclined structure, a progress path of an optical signal incident to the reflection surface may be changed in a vertical direction.

According to an example embodiment, in the case of applying a silicon optical bench, an alignment mark of the third substrate on which the optical detector 140 is provided may be configured as the silicon optical bench. Here, the optical signal reflector 130 may be aligned in a V-shaped groove formed through chemical silicon etching.

Referring to FIG. 8C, the optical signal reflector 130 may be configured in a form in which a reflection surface block is provided on a predetermined substrate on which an alignment mark(s) is formed. Here, the reflection surface may be formed at an angle $\theta_1$ of 45 degrees. Depending on cases, the reflection surface may be formed at an angle different from $\theta_1$, for example, formed at a specific angle $\theta_2$. The optical signal detecting device 100 may change a progress path of an optical signal in a vertical direction using the optical coupling lens 120 of which the emission surface is in parallel with the optical signal reflector 130. Here, a part may be mounted to the optical signal detecting device 100 using alignment of an alignment mark of the third substrate on which the optical detector 140 is provided and an alignment mark formed on the optical signal reflector 130.

Figure 9A:
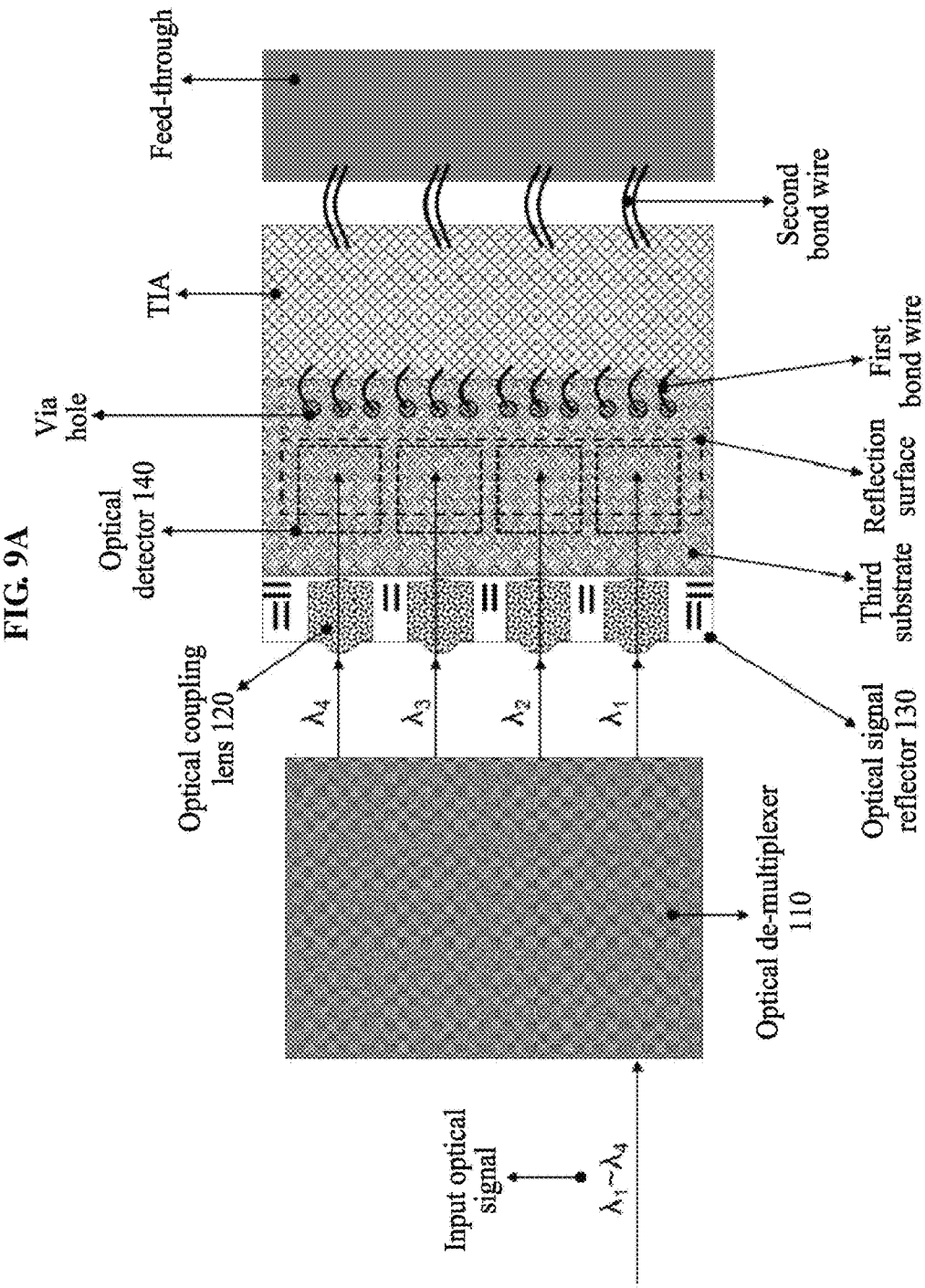
FIGS. 9A and 9B illustrate an optical signal detecting device according to an example embodiment.
Figure 9B:
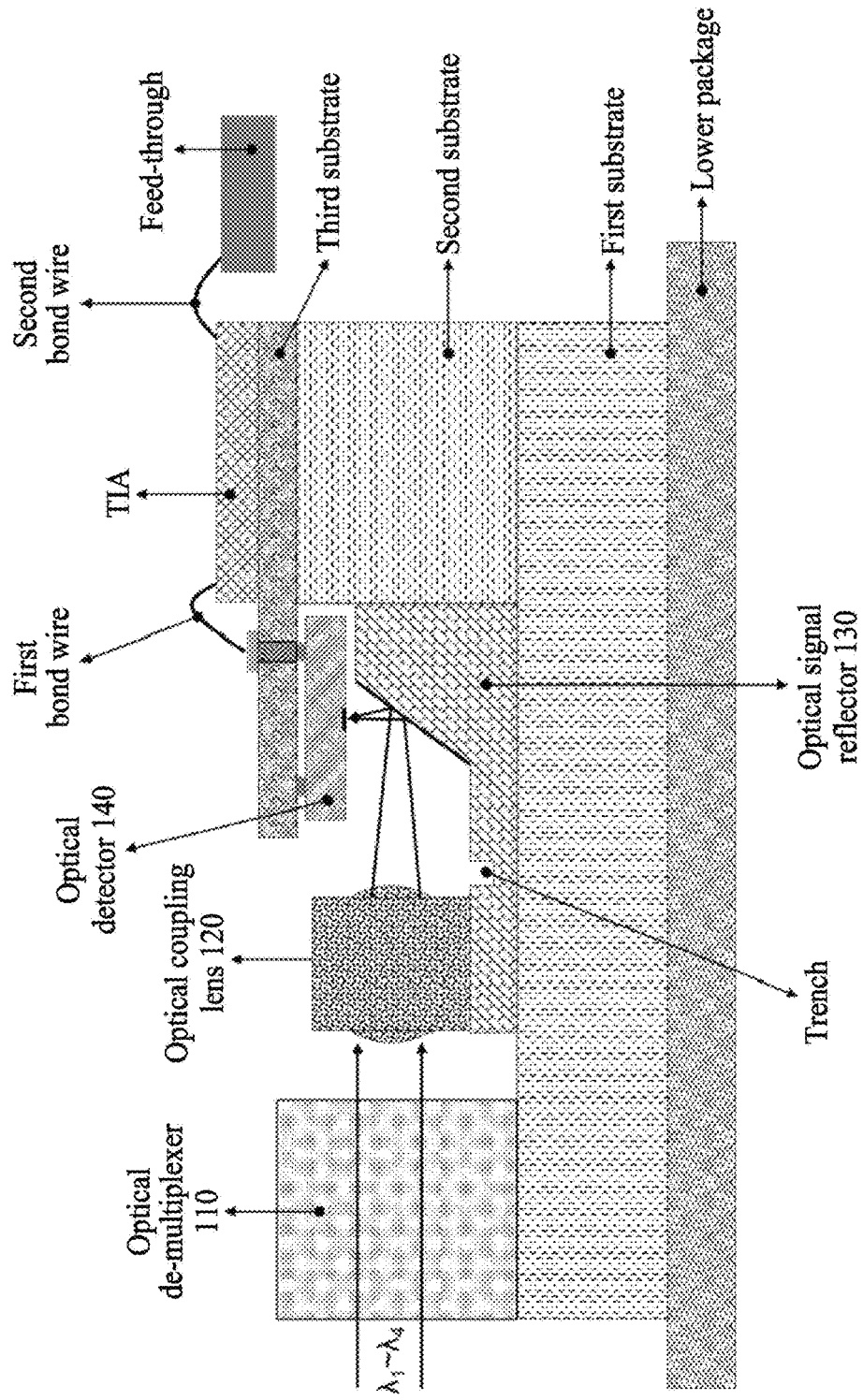

FIGS. 9A and 9B illustrate the optical signal detecting device 100 according to an example embodiment.

FIG. 9A is a top view of the optical signal detecting device 100 and FIG. 9B is a side view of the optical signal detecting device 100. Referring to FIG. 9A, the optical signal detecting device 100 may include the optical detector 140 and the TIA chip on the third substrate as a single substrate. Each optical signal emitted through the optical de-multiplexer 110 may be incident to the optical coupling lens 120 in a single channel form. An optical signal may be incident in a parallel beam form or a form of a beam that is emitted based on a refractive index between an external medium and a boundary surface of the emitter of the optical de-multiplexer 110. Also, an optical signal emitted through the optical coupling lens 120 may be applied to and reflected from the optical signal reflector 130 and thereby applied to the optical detector 140.

A reflection surface may be formed on the optical signal reflector 130 to change a progress path of an optical signal. The optical detector 140 may be provided at a location preset on the third substrate using a solder. Here, the optical signal applied to the optical detector 140 may be transformed to a current signal and may be connected to a substrate surface that is disposed to face a substrate surface on which the optical detector 140 is provided through a via hole formed on the third substrate and thereby applied to the TIA chip through the first bond wire. The optical signal applied to the TIA chip may be transformed to a voltage signal and thereby amplified.

The optical signal reflector 130 and the optical detector 140 provided on the third substrate may be manually aligned or assembled using an alignment mark formed on the third substrate and the optical signal reflector 130. The reflection surface formed on the optical signal reflector 130 may be formed on a single substrate through a silicon optical bench process, and may be formed by mounting a block on which the reflection surface is formed on a separate substrate.

Referring to FIG. 9B, an electrical signal output from the TIA chip may be connected to the feed-through of the package through the second bond wire and thereby connected to an outside. The optical coupling lens 120 may be provided to a groove for the optical coupling lens 120 formed on the optical signal reflector 130. An emission surface of the optical coupling lens 120 may be convex. A size or a diameter of a convex lens of the emission surface of the optical coupling lens 120 may be less than that of a convex lens of an incident surface of the optical coupling lens 120.

The first substrate may include a material having a relatively excellent electrical insulation and a relatively high thermal conductivity based on a structure of the optical signal detecting device 100. Depending on cases, when the first substrate has the same potential or ground between a case of the optical signal detecting device 100 and a chip used for the optical signal detecting device 100, the first substrate may include a material such as metal. Also, a size of the second substrate or the third substrate may be enlarged to mount the optical signal reflector 130, the TIA chip, or the optical detector 140.

Figure 10A:
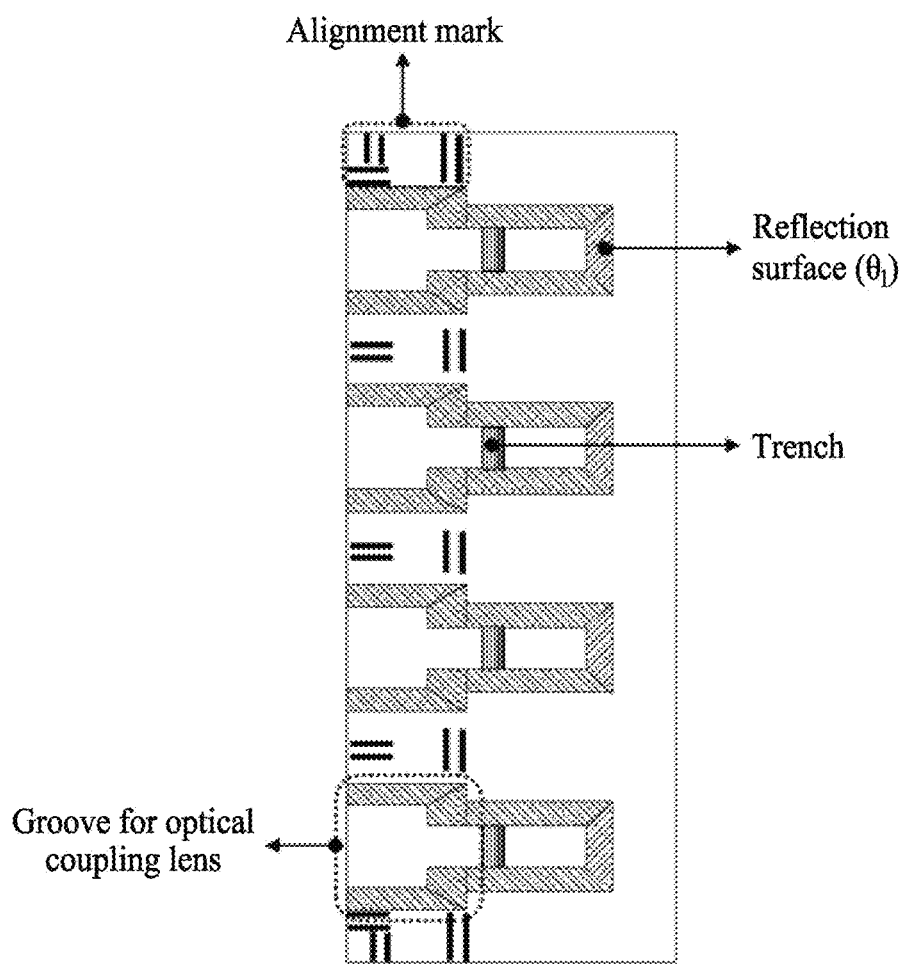
FIGS. 10A and 10B illustrate a structure of an optical signal reflector and a shape of an optical coupling lens according to an example embodiment.
Figure 10B:
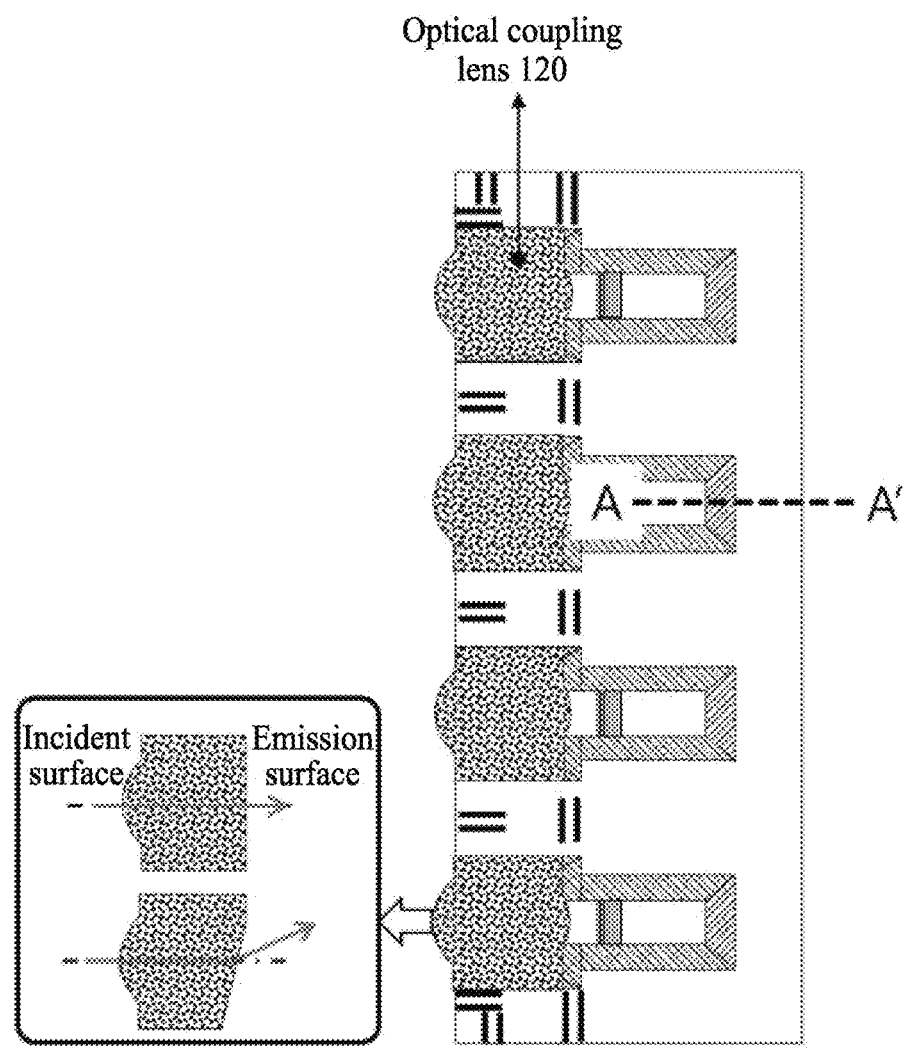

FIGS. 10A and 10B illustrate a structure of the optical signal reflector 130 and a shape of the optical coupling lens 120 in the optical signal detecting device 100 according to an example embodiment.

Referring to FIG. 10A, it can be known that the optical signal reflector 130 may be configured using a silicon optical bench. A reflection surface of the optical signal reflector 130 may be formed at an angle of 45 degrees or 54.74 degrees based on a crystal direction by a chemical silicon etching method. Also, the optical signal reflector 130 may be set to accurately align and assemble a central axis of a lens and a center of the reflection surface using a groove for the optical coupling lens 120. In the case of fixing the optical coupling lens 120 using epoxy, a trench may be formed between the reflection surface and the groove for the optical coupling lens 120 to prevent the epoxy from contaminating the reflection surface.

The optical signal reflector 130 and the optical detector 140 provided on the third substrate may be manually aligned and assembled using an alignment mark formed on the optical signal reflector 130 and an alignment mark formed on the third substrate on which the optical detector 140 is provided. The reflection surface may be formed at an angle of 45 degrees to change a progress path of the optical signal to 90 degrees that is a vertical direction through the optical signal reflector 130.

Referring to FIG. 10B, a flat lens may be used for an emission surface of the optical coupling lens 120. Also, depending on cases, if the reflection surface of the optical signal reflector 130 is formed at an angle of 54.74 degrees, an optical signal needs to be incident at a specific angle $\theta_2$ to the reflection surface formed at the angle of 54.74 degrees. Here, the optical signal detecting device 100 may change a progress path of an optical signal in a vertical direction using a shape in which the emission surface of the optical coupling lens 120 is inclined. Here, FIG. 10B also includes a cross-sectional view of the optical signal reflector 130 cut along a line A-A'.

FIG. 11 is a flowchart illustrating an optical signal detecting method according to an example embodiment.

Referring to FIG. 11, the optical signal detecting method performed by the optical signal detecting device 100 may include the following operations 1110 through 1130.

In operation 1110, the optical signal detecting device 100 may de-multiplex an input optical signal to optical signals of different wavelengths. Here, the optical signals of different wavelengths may be different optical signals of different wavelengths.

In operation 1120, the optical signal detecting device 100 may change progress paths of the optical signals of different wavelengths using the optical coupling lens 120. Here, the optical signals of different wavelengths of which the progress paths are changed may be incident to the optical signal reflector 130.

In operation 1130, the optical signal detecting device 100 may detect the optical signals of different wavelengths that are reflected from the optical signal reflector 130.

According to example embodiments, the optical signal detecting method may easily manufacture the large optical signal detecting device 100 and may reduce a module cost.

According to example embodiments, the optical signal detecting method may provide the optical signal detecting device 100 at low cost by applying a low-cost technology for changing a progress path of an optical signal, instead of applying a high-cost technology for a substrate having a lateral pattern. Also, it is possible to reduce a module cost through a process simplification and a low-cost package by manually aligning and assembling principal parts that constitute the optical signal detecting device 100.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical signal detecting device comprising:
   an optical de-multiplexer configured to de-multiplex an input optical signal to optical signals of different wavelengths;
   an optical coupling lens configured to allow the optical signals of different wavelengths to be incident;
   an optical signal reflector configured to reflect the optical signals of different wavelengths emitted from the optical coupling lens; and
   an optical detector configured to detect the reflected optical signals of different wavelengths,
   wherein the optical coupling lens and the optical detector are aligned using at least one alignment protrusion, and
   wherein a shape of an emission surface of the optical coupling lens is set based on an angle of a reflection surface of the optical signal reflector.

2. The optical signal detecting device of claim 1, wherein the optical coupling lens is configured to change a progress path of each of the incident optical signals of different wavelengths.

3. The optical signal detecting device of claim 1, wherein, in the optical coupling lens, a shape of an incident surface to which the optical signals of different wavelengths are incident is different from the shape of the emission surface from which the optical signals of different wavelengths are emitted.

4. The optical signal detecting device of claim 1, wherein the optical signal reflector comprises the reflection surface provided at a predetermined angle of inclination and configured to reflect the optical signals of different wavelengths emitted from the optical coupling lens toward the optical detector.

5. The optical signal detecting device of claim 1, further comprising:
   a first bond wire configured to transform the detected optical signals of different wavelengths to a current signal and to transfer the current signal;
   a trans-impedance amplifier (TIA) configured to transform the current signal transferred through the first bond wire to a voltage signal and to amplify the voltage signal;
   a second bond wire configured to output the transformed and amplified voltage signal to an electrical signal and to transfer the electrical signal; and
   a feed-through configured to transfer the electrical signal transferred through the second bond wire to an outside.

6. The optical signal detecting device of claim 1, wherein each of a plurality of optical coupling lenses is provided at a location of the optical signal reflector to allow each of the optical signals of different signals to be incident.

7. The optical signal detecting device of claim 1, wherein the optical detector is configured to transfer a voltage signal transformed from the detected optical signals of different wavelengths to a trans-impedance amplifier (TIA) using a via hole.

8. The optical signal detecting device of claim 1, wherein the optical detector is provided using an alignment mark of the optical signal reflector.

9. The optical signal detecting device of claim 1, wherein the optical coupling lens comprises at least one of an incident surface to which the optical signals of different wavelengths are incident and the emission surface from which the optical signals of different wavelengths are emitted in a convex shape.

10. The optical signal detecting device of claim 1, wherein the optical detector is provided to be in parallel with a progress direction of the input optical signal.

11. The optical signal detecting device of claim 1, wherein the optical coupling lens is provided to be vertical relative to a progress direction of the input optical signal.

12. The optical signal detecting device of claim 1, wherein the optical coupling lens is configured to emit each of the optical signals of different wavelengths in a different direction based on the shape of the emission surface from which the optical signals of different wavelengths are emitted.

13. The optical signal detecting device of claim 12, wherein the shape of the emission surface of the optical coupling lens is selected based on an angle at which the reflection surface is formed on the optical signal reflector.

14. The optical signal detecting device of claim 5, wherein the optical detector is provided to face the TIA on the same substrate.

15. An optical signal detecting method, the method comprising:

de-multiplexing an input optical signal to optical signals of different wavelengths;

changing progress paths of the optical signals of different wavelengths using an optical coupling lens so that the optical signals of different wavelengths of which progress paths are changed are incident to an optical signal reflector; and detecting the optical signals of different wavelengths reflected from the optical signal reflector, wherein the optical coupling lens and the optical detector are aligned using at least one alignment protrusion, wherein a shape of an emission surface of the optical coupling lens is set based on an angle of a reflection surface of the optical signal reflector.

16. The optical signal detecting device of claim 1, wherein the optical coupling lens comprises an array of lens on one side and the at least one alignment protrusion on the other side of the optical coupling lens.

* * * * *